United States Patent

Ilan et al.

[11] Patent Number: 5,982,929
[45] Date of Patent: *Nov. 9, 1999

[54] PATTERN RECOGNITION METHOD AND SYSTEM

[75] Inventors: Gabriel Ilan, Tel Aviv; Eran Aharonson, Ramat Hasharon, both of Israel

[73] Assignee: Advanced Recognition Technologies, Inc., Menlo Park, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/418,530

[22] Filed: Apr. 7, 1995

[30] Foreign Application Priority Data

Apr. 10, 1994 [IL] Israel ........................................ 109268

[51] Int. Cl.$^6$ ........................................................ G06K 9/48
[52] U.S. Cl. ................................. 382/200; 382/198; 704/9
[58] Field of Search ......................... 364/419.05, 419.08, 364/419.02, 419.01; 382/159, 186, 187, 195, 202, 225, 226, 227, 228, 229, 230, 231; 704/2, 9, 5

[56] References Cited

U.S. PATENT DOCUMENTS

| | | | |
|---|---|---|---|
| 3,930,229 | 12/1975 | Crane et al. | 340/146.3 |
| 4,284,975 | 8/1981 | Odaka | 340/146.3 |
| 4,589,142 | 5/1986 | Bednar | 382/226 |
| 4,653,107 | 3/1987 | Shojima et al. | 382/13 |
| 4,718,102 | 1/1988 | Crane et al. | 382/13 |
| 4,754,489 | 6/1988 | Bokser | 382/40 |
| 5,029,223 | 7/1991 | Fujisaki | 382/187 |
| 5,056,021 | 10/1991 | Ausborn | 364/419.08 |
| 5,062,143 | 10/1991 | Schmitt | 382/230 |
| 5,067,165 | 11/1991 | Nishida | 382/195 |
| 5,146,406 | 9/1992 | Jensen | 364/419.08 |
| 5,392,363 | 2/1995 | Fujisaki et al. | 382/187 |
| 5,490,061 | 2/1996 | Tolin et al. | 364/419.02 |
| 5,519,608 | 5/1996 | Kupiec | 364/419.08 |
| 5,528,491 | 6/1996 | Kuno et al. | 364/419.08 |

*Primary Examiner*—Jon Chang
*Assistant Examiner*—Jayanti K. Patel
*Attorney, Agent, or Firm*—Skjerven, Morrill, MacPherson, Franklin & Friel, LLP

[57] ABSTRACT

A method for pattern recognition of indicia composed of alphabetical characters of a language in the form of at least a part of a word. The shape of each character in a word is established by means of a pattern shape recognizer. A probability value designating the relative confidence in the recognition of the character as one of the language characters is assigned to each character. The established shapes of the characters are then sequentially applied to a linguistic recognizer for further processing and the probability values of language structure to each of the language characters is assigned. Then the probability values assigned to the characters in the shape recognizer is combined with the corresponding probability values assigned to the characters in the linguistic recognizer and the path between characters possessing the highest probability values is determined.

20 Claims, 11 Drawing Sheets

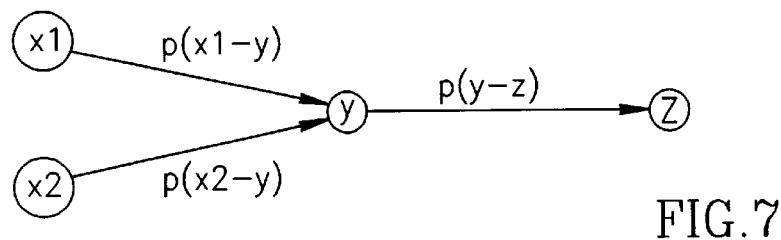
FIG. 7
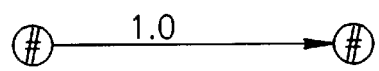
FIG. 8
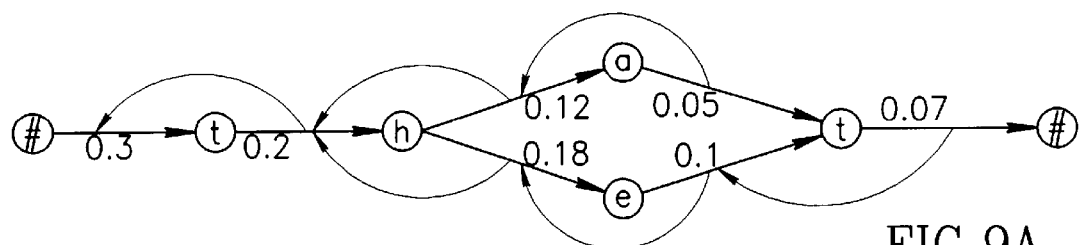
FIG. 9A
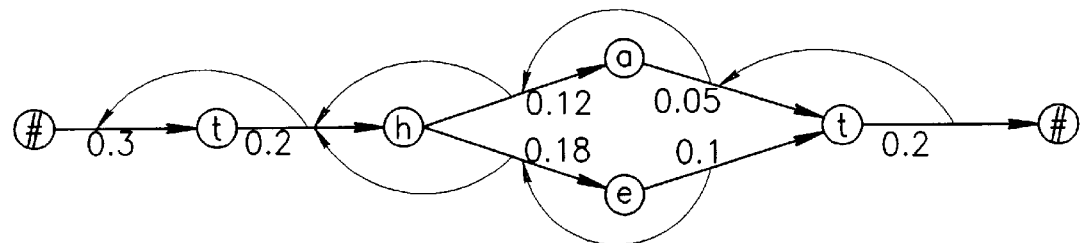
FIG. 9B
*close*
{d, 0.6} {o, 0.7} {s, 1.0} {l, 0.53} {SPACE, 0.7}
{cl, 0.4} {o, 0.3}       {e, 0.47} {NO_SPACE, 0.3}
FIG. 10

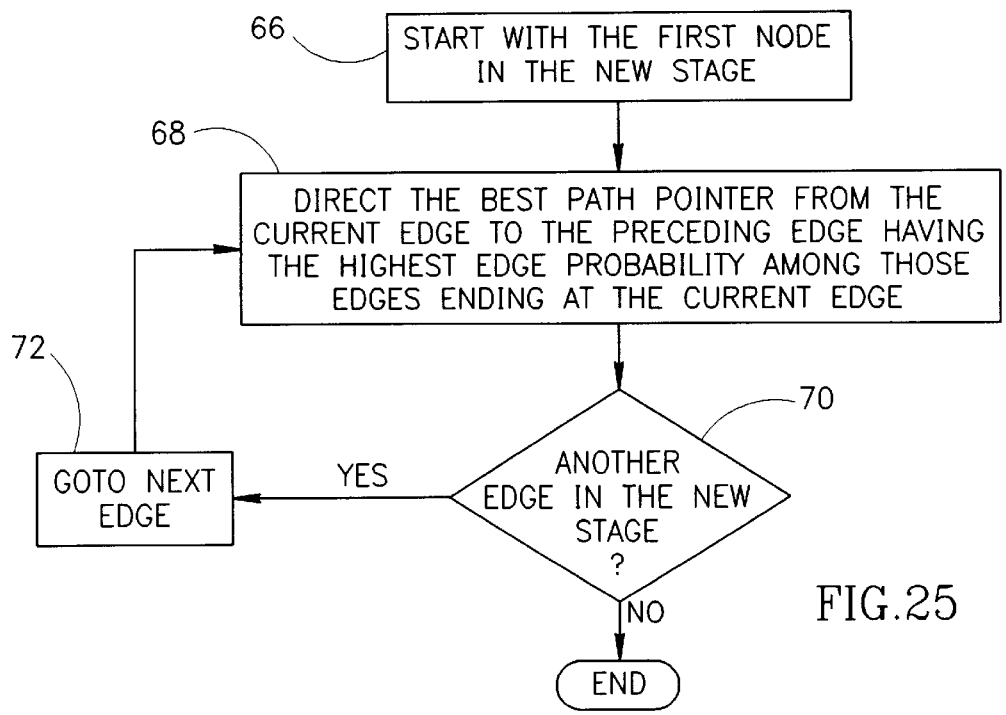
FIG.25
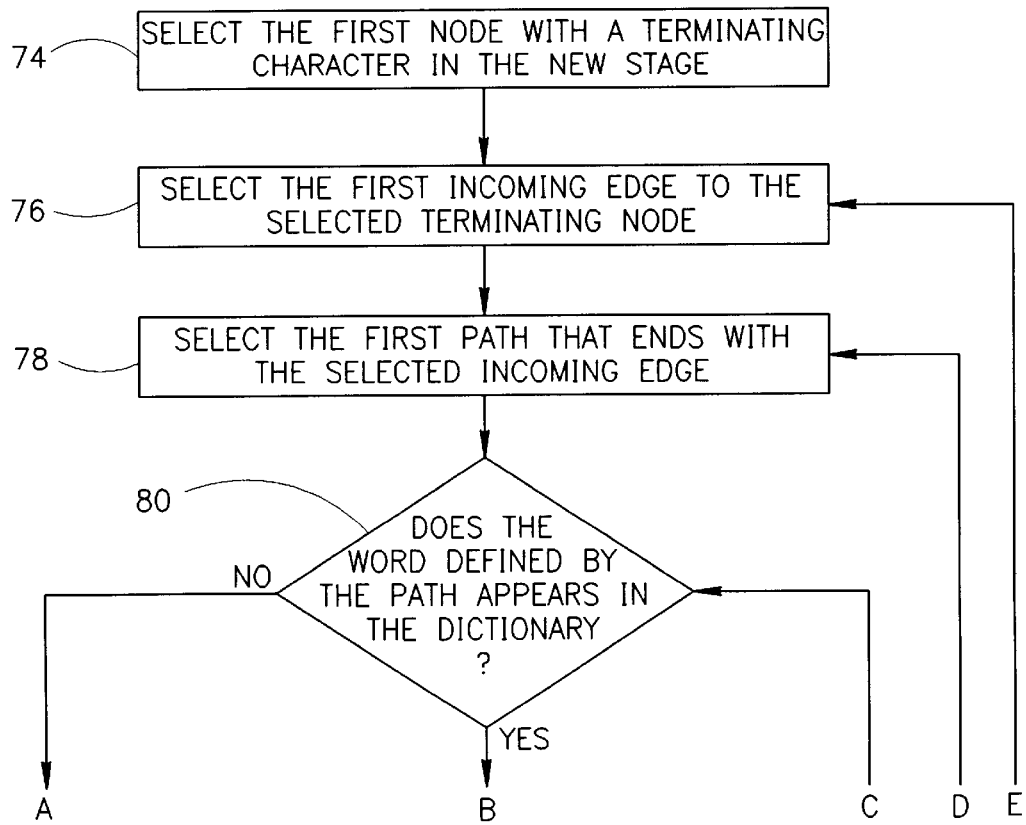
FIG.26/1

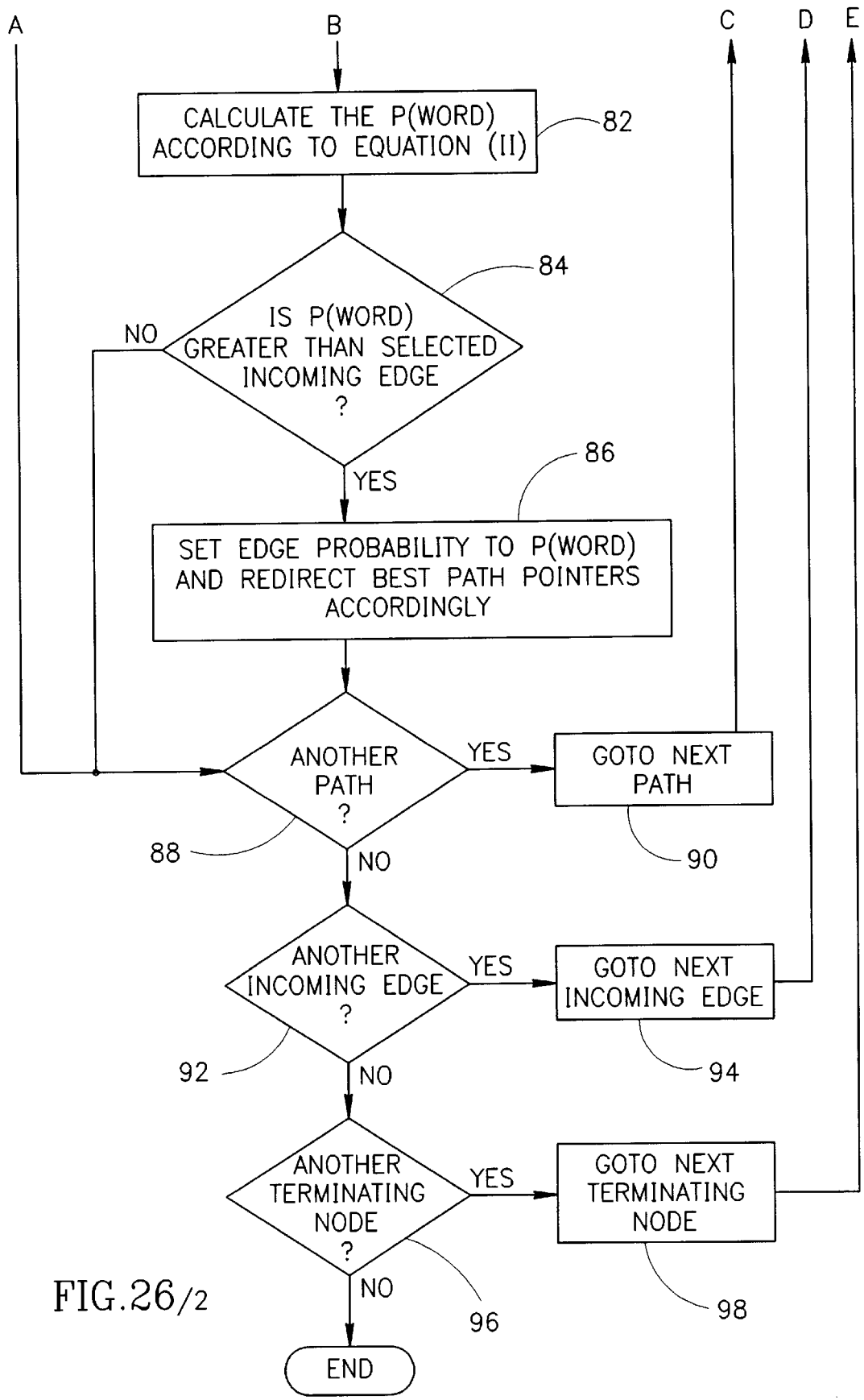
FIG.26/2

PATTERN RECOGNITION METHOD AND SYSTEM

FIELD OF THE INVENTION

The present invention relates to a pattern recognition method and system for recognizing patterns originating from voice, handwritten script, or symbols. The method and system are capable of processing any language including natural languages, which language exhibits special relationships among the patterns composing the alphabet of said language.

In particular, the invention relates to a handwriting recognition method and system and to a pattern recognition method and system which have provisions for resolving shape-based or other localized recognition ambiguities.

BACKGROUND OF THE INVENTION

Initial approaches to recognize handwritten text have primarily concentrated on criteria to match the input pattern against reference patterns, and to select that reference symbol which best matched the input pattern as the recognized pattern. This family of matching criteria is often called "shape matching". A wide variety of shape-based recognition systems are known in the art. Representatives of such shape-based recognition systems are described in U.S. Pat. Nos. 3,930,229; 4,284,975 and 4,653,107.

Common to all the shape-based systems is that irrespective of the matching criteria used, the information is processed locally, and that such systems are not very accurate in resolving ambiguities among reference patterns which exhibit shape similarity.

The use of character context or linguistic rules as additional information for recognizing characters has been extensive in a variety of fields, such as cryptography, natural language processing, etc. Systems introducing global context and syntax criteria have been offered for improving shape-based recognition, in order to distinguish among members of a "confusion set." A system representative of this approach is described in U.S. Pat. No. 4,754,489. The system of this patent uses conditioned probabilities of English characters appearing after a given character sequence, and probability of groups of English characters to suggest syntax rules.

Another representative system is described in U.S. Pat. No. 4,718,102, which is directed to ideogram-based languages such as Kanji, in which a shape-based algorithm producing a confusion set is disambiguated by simulating human experience. The disambiguating routines are based on actual studies of particular characters.

It appears that the approaches taken heretobefore resulted in systems suffering from the following problems: They are not sufficiently general to cover different languages; require computationally prohibitive time and memory resources; do not include the shape information in a statistical, meaningful fashion; are not adaptive in texts of varying linguistic and syntax content; and operate as post-processes, not contributing to the segmentation of input patterns.

SUMMARY OF THE INVENTION

It is therefore a broad object of the present invention to provide a global linguistic and syntax method and system that are not only capable of improving the quality of presently-used pattern recognition systems and particularly of handwriting systems, but also of doing so efficiently.

In accordance with the present invention, there is therefore provided a method for pattern recognition of indicia composed of alphabetical characters of a language in the form of at least a part of a word, which includes the steps of establishing the shape of each character in the word by means of a pattern shape recognizer; assigning to each character a probability value designating the relative confidence in the recognition of the character as one of the language characters; sequentially applying the established shapes of the characters to a linguistic recognizer for further processing, including assigning probability values of language structure to each of the language characters; combining the probability values assigned to the characters in the shape recognizer with the corresponding probability values assigned to the characters in the linguistic recognizer, and determining the path between characters possessing the highest probability values.

The invention further provides a system, including a pattern shape recognizer, consisting of an input device; a digitizer; a segmentation unit; feature extraction unit; and a classification unit for classifying extracted features of the pattern into vectors of candidates, each constituted by at least one language character; at least one path indicator defining possible character sequence or sequences within each candidate and between candidates corresponding to the input pattern, while assigning to each character a probability value designating the relative confidence in the recognition of the character as one of the language characters; and a linguistic recognizer receiving the vectors of candidates having assigned character probability values, and including means for assigning probability values of language structure selected from the group consisting of statistical dictionary components, language statistical N-gram components wherein N is a positive integer, and language syntax description components, to the candidates to form edge probability values, and means for combining the probability values assigned to the characters of the pattern shape recognizer with the probability values of the linguistic recognizer so as to determine the best path characters possessing the highest probability values.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

FIG. 7 depicts node and edge probabilities involved in calculating the probability P(y-z) at a new edge y-z;

FIG. 8 shows the first two stages of the candidate graph, wherein the # symbol designates "space" and the probability assigned to the edge connecting the two stages is set to 1.0;

FIG. 9A is an example of a graph with starting and ending nodes "#," marking the connecting edges between the nodes, the weights of the edges, and the resulting path pointers;

FIG. 9B is the same graph as FIG. 9A, after implementing the dictionary-based mechanism;

FIG. 10 illustrates the raw input pattern presented to the shape recognizer (top), and the candidate vectors together with their respective shape probabilities consequently presented to the linguistic recognition stages;

FIG. 25 is a block diagram showing the operation of assigning best path pointers to new nodes; and FIG. 26 is a block diagram showing the operation of assigning dictionary improvements.

DETAILED DESCRIPTION OF A PREFERRED EMBODIMENT

For the simplicity of the description of the embodiments of the invention, and with no limitation on the applicability thereof to other pattern recognition fields, the following embodiments will be described with reference to an on-line handwriting recognition method and system.

Figures 1, 2, 3:
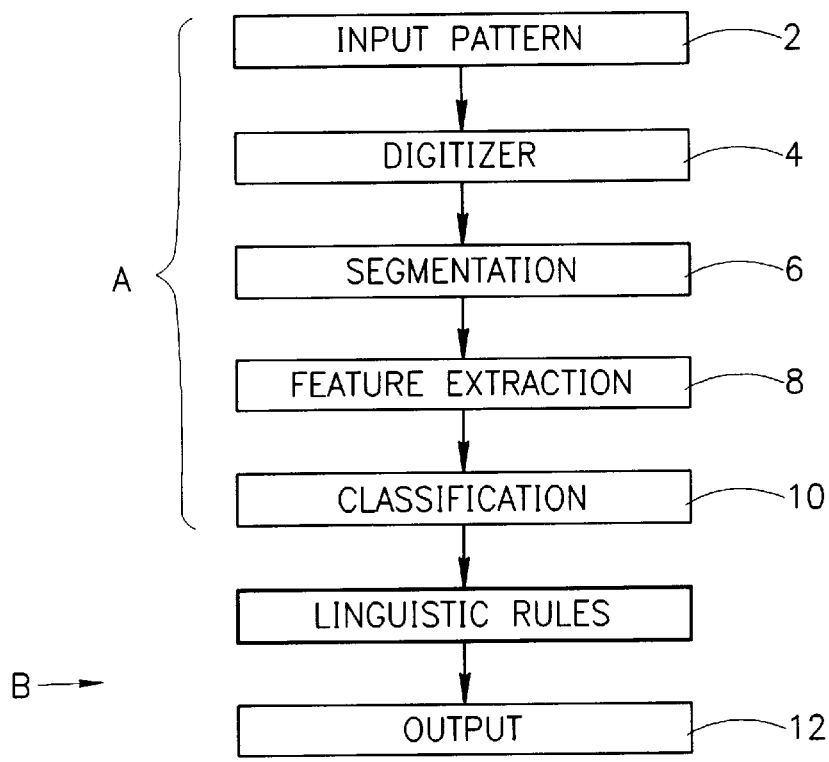
FIG. 1 is a block diagram of the pattern recognition system according to the present invention.
FIG. 2 is an example of a handwritten word which a shape recognizer cannot unequivocally determine as an intended word.
FIG. 3 illustrates groups of candidate vectors containing suggested recognition(s) and respective relative local recognition probability.

Shown in FIG. 1 is a handwriting recognition system of the present invention, consisting of two recognition devices: a shape recognizer A, followed by a linguistic recognizer B. In a preferred embodiment, use is made of an arbitrary, per se known, shape recognizer A in order to emphasize the independence of the linguistic recognizer B therefrom. Such a recognizer may include a pattern input unit 2, a digitizer 4, a segmentation unit 6, feature extraction unit 8, and a classification unit 10.

The input to the linguistic recognizer B is a stream of vectors, each containing one or more suggested candidate patterns (hereinafter referred to as "candidates"), and a probability associated with each candidate, designating relative probability of recognition of the shape of the raw input pattern. Each candidate can be composed of one or more classified ASCII characters (hereinafter referred to as "characters"). The candidates of a given vector are arranged in descending order of likelihood of combinations of matching characters. The object of the additional linguistic recognizer B is to consider candidates of successive vectors, and to make final selection of a candidate combination, taking into account their individual match probability with global linguistic considerations.

Further processing and final recognition decisions are made at the linguistic recognition stage. The necessity to delay the final recognition decision from the shape recognition stage to the linguistic one is due to the fact that shape recognition, being a local process, does not consider global information which greatly improves recognition quality. This additional global information is, by and large, the dependency that often exists among successive characters, which dependency must be taken into consideration in order to achieve more accurate recognition of patterns.

In FIG. 2 there is illustrated a handwritten word which is entered into a shape recognizer. This is an example of a handwritten word in which a shape recognizer cannot "unequivocally" determine which combination of possible matched characters is the most likely combination. Two main possible interpretations that can be made are the two words "close" and "dose". The handwritten word exhibits an ambiguity as to how to decompose the pattern into characters, such as the simple confusion between the first two symbols, which can be interpreted as a "d" or as "cl," thus yielding the word "dose" or the word "close." Other indeterminable shape recognition confusion may also occur, such as the interpretation of the third symbol of FIG. 2 as an "o," "O," "0," "u," and many other possibilities.

Since shape recognition is in essence a local operation, ambiguities may arise as to how to decompose/compose the input patterns into classified characters. Therefore, the shape recognizer should not, and does not, make final decisions, but rather it makes preliminary examination of possible classifications and produces a set of possibilities, to be later resolved by a wider operation of the linguistic recognizer. In other words, the shape recognizer eliminates most classifications and produces a vector of candidate characters for different parts of the input pattern from those decompositions which obtained high individual recognition probability.

An example of a possible decomposition and recognition of the input pattern given in FIG. 2 is shown in FIG. 3, together with the respective local recognition probabilities. As seen, the list of candidate vectors is arranged from left to right, according to the order of writing. Each vector contains, for each part of the hand-written word, all the possible recognitions which passed the shape recognition criterion. Candidates are arranged in descending order of values of shape recognition probabilities, from top to bottom. The first vector contains both a single, suggested character and complex suggestions, because the shape recognizer produced a high shape recognition probability for the first two input symbols ("cl", "Cl," "d," or "cl") to be associated with a single, or complex, characterstructure. As can be further appreciated, if one recognizes characters based only on the shape recognizer's probability, then in this example the most likely word would be "cl0sl," since these candidates have the highest shape recognition probability in each vector.

The use of the linguistic recognition unit as a second recognition stage is mainly due to the fact that the information available to a shape recognizer is limited to local features. The ability to include additional information, such as wide-range dependencies among character candidates, facilitates the correct selection of the most likely combination of candidates.

In order to improve over the local shape probability provided by the shape recognizer, the linguistic recognizer combines the shape score together with global statistical information regarding the likelihood of each particular candidate occurring together with its neighbouring candidates. Thus, selecting the most likely candidate from each vector is achieved by using statistical information concerning the language of the written text. The language statistical information includes a statistical dictionary, appearance probability of triplets of characters, and writing rules. All the statistical information is collected automatically from large texts of the relevant vocabulary of a given language, and is readily available.

The linguistic recognizer inputs are of two types: a priori information collected off-line describing the language in use; and run-time information of current possible recognition obtained from the shape recognizer (candidate vectors). The language information consists of three components: statistical dictionary, language statistical N-gram wherein N is a positive integer, and language syntax description.

The dictionary is a table which contains common words of the language and their respective appearance probability. The appearance probability $P_\sigma$, assigned to a word a of length n, is defined as follows:

$$P_\sigma = \frac{\text{(Total number of appearances of } \sigma \text{ in text)}}{\Sigma \text{(Total number of appearances of word in text)}}$$

$\Sigma$ = words of length $n$ in text.

The size of the dictionary is determined according to memory space and processing grounds, and also according to noise considerations. The inclusion of words which appear too sporadically proves to be counter-productive, since the side benefit of increased precision subsides in the face of added noise.

As explained above, the statistical dictionary does not contain the full vocabulary of any given language. To fill the gap for those words which do not appear in the dictionary, an alternative mechanism is used, the statistical N-gram, e.g., tri-gram, which approximates the appearance probability of a sequence of characters in a given language. The theoretical basis of the statistical tri-gram is the statistical theory associated with Markov chain data structures, relating to the manner in which the probability of any sequence of characters can be derived or approximated, if the conditioned probability of any character to appear after any other possible character sequence, is given. That is, according to Bayes' rule, $$P(x_1 x_2 x_3 \ldots x_n) = P(x_n / x_1 x_2 x_3 \ldots x_{n-1}) * P(x_n / x_1 x_2 x_3 \ldots x_{n-1})$$
$$= P(x_n / x_1 x_2 x_3 \ldots x_{n-1}) * P(x_{n-1} / x_1 x_2 x_3 \ldots x_{n-2}) *$$
$$P(x_1 x_2 x_3 \ldots x_{n-2})$$
$$= P(x_n / x_1 x_2 x_3 \ldots x_{n-1}) * P(x_{n-1} / x_1 x_2 x_3 \ldots x_{n-2}) *$$
$$\ldots P(x_2 / x_1) * P(x_1)$$

wherein:
$P(x_1 x_2 x_3 \ldots x_n)$ is the probability of the character string $x_1 x_2 x_3 \ldots x_n$;
n is the number of characters in the string; and
$P(A/B)$ is the conditioned probability of event A, given the event B.

The longer the character sequence considered, the more accurate the approximated conditioned probability becomes. In summary, the tri-gram mechanism uses a second order Markov chain as a compromise between computation and memory demands and accuracy.

The tri-gram contains only those triplets of letters which are frequent enough (not distinguishing between upper case and lower case letters) including a blank space, and their respective probability of appearance [hereinafter, "$P_{tri}$(x-y-z) probability" designates the probability of the character "z" to appear after the two-character sequence "xy"]. For each possible triplet of letters in an alphabet, the probability of appearance is defined as the conditioned appearance probability of the third letter in the triplet appearing after the given two previous letters of the triplet. All the triplets that do not appear in the tri-gram receive a small basic probability.

Normally, the ti-gram table should distinguish between upper and lower case characters, and consequently should contain information about both cases. For example, rather than storing the probability of a single sequence "aaa," it should have contained probability values for eight combinations of upper and lower case characters. To save memory and to speed-up processing, we assume independence between the appearance probability of a character and the probability of being an upper or lower case. Thus, most of the writing rules over groups of characters are generalized, such as rules relating to upper case characters, rules relating to pagination characters, rules relating to numbers, etc.

One way to represent these rules is to represent each group with a single symbol, such as representing the group of lower case characters with "a" and the group of upper case characters with "A," and to derive the probability of sequences of characters belonging to different groups. Furthermore, there are languages, such as English, for which most of the writing rules relate to short sequences of characters. Thus, much of the writing rules can be represented by the appearance probability of short combinations of character groups. For example, to implement the rule that prevents writing an English sequence of a lower, an upper, and a lower case letters, it is enough to assign a low appearance probability to the template "aAa," using the above-mentioned character group representation. Similarly, if "space" is denoted with the character "#," then a high appearance probability to the template ".#A" (corresponding to the letter sequence of "period, space, upper case letter") will represent the English rule that a sentence begins with a capital letter.

Thus reducing much of the writing rules to probabilities of local interactions between groups of characters, the same probability mechanism as that used for the tri-gram information can be employed to enforce writing rules [hereinafter, "$P_{SRL}$(x-y-z) probability" designates the probability of the character group "z" to appear after the two character groups "xy"]. In the present invention, PSRL probabilities are calculated for triplets of character groups. For example, the English implementation of this representation of writing rules represents all lower case letters as one group (hereinafter, "a"); all upper case letters as one group (hereinafter, "A"); all numerals as one group (hereinafter, "0"), and all other relevant characters (such as "space," "$," "?," "!," etc.) individually.

The shape recognizer A produces a stream of vectors, each containing recognized candidates associated with some temporal decomposition of the input pattern, so that the Cartesian product of the vectors represents all the possible recognized character combinations associated with the input pattern.

Referring to FIG. 3, it can be seen, e.g., that each row of the first column from the left contains a candidate and its respective shape probability. The different candidates are, in decreasing shape score order:

1. "c" and "l"—highest probability candidate with P(cl) shape recognition probability;
2. "C" and "l"—second best candidate, with P(Cl) local shape recognition probability;
3. "d"—third best candidate, with P(d) local shape recognition probability;
4. "c" and "l"—least likely candidate with P(cl) local shape recognition probability.

It is important to remember that the ASCII character "space" is a character as any other character in an alphabet (designated hereinafter by the character "#"). Furthermore, in addition to the "space" character, an additional pseudo-character "no space" is used (designated hereinafter by the character "≈"). The use of the additional "no space" character is to resolve ambiguity, whether a detected space is a space in the full syntactical meaning separating two words, or is a "no space," a space separating two letters of the same word.

For example, a vector may contain the two candidates:

$$\begin{bmatrix} \# \\ \approx \end{bmatrix} \text{ or } \begin{bmatrix} \text{space} \\ \text{no space} \end{bmatrix}$$

if there is a doubt whether a word should end at the previous vector, or not.

At the beginning of a recognition stage, the system loads the language syntax description, language statistical dictionary and language statistical tri-gram. As the shape recognizer releases candidate vectors, these linguistic components are applied to make final recognition decisions, and to improve the overall recognition performance.

The manipulation and integration of the three language information sources is based on a data structure known as a Directed-A-cyclic Graph (hereinafter, "DAG" or "the graph").

Figure 4:
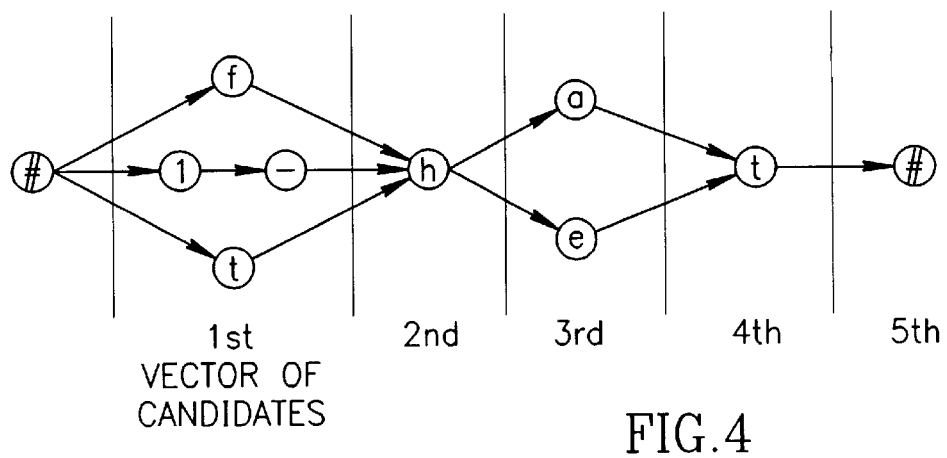
FIG. 4 illustrates an example of a directed a-cyclic graph in which the nodes (circles) represent characters and the edges (arrows) represent the trajectory of possible moves.

An example of a schematic DAG structure is given in FIG. 4. The nodes in the graph designated by circles represent the characters used in the language, while the edges of the graph, shown as arrows, represent the trajectory of possible moves from a previous character to a succeeding character. Any valid move through the graph edges in the direction of writing (hereinafter, "path" or "path indicator") defines a plausible character sequence that corresponds to the input pattern.

The general method of creating the graph is based on concepts of dynamic programming, where, apart from the initialization of the first stage of the system, the construction of each new stage is based on the previous stage, and is performed by the same mechanism. Three steps compose the mechanism which implements the tri-gram and SRL linguistic information in the DAG structure:

a) adds a new stage to the graph when the shape recognizer supplies a new vector of candidates;
b) connects the nodes of the new stage to the nodes of the graph with new edges; and
c) assigns probabilities to the new edges.

Figure 5:
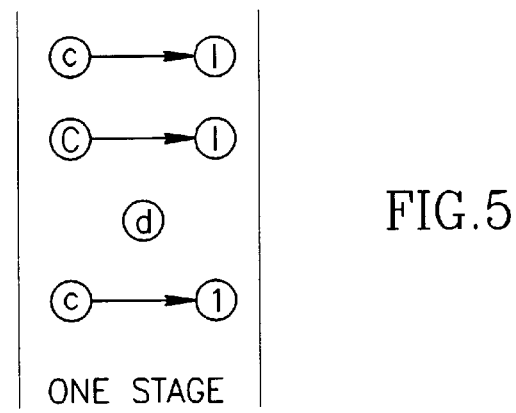
FIG. 5 illustrates one stage of the graph of FIG. 4, formed from the candidates provided by the shape recognizer.

The graph structure according to the present invention is created stage by stage, according to the stream of candidate vectors produced by the shape recognizer. Each vector results in a new stage being added to the graph (FIG. 5). Each character in the vector forms a new node. Candidates of multiple characters form a node for each character they contain. To preserve the order of characters which appear in a given candidate, the respective nodes are connected sequentially with edges pointing from the first character to the consecutive one, until the last character is connected. For clarity, graphs are drawn sequentially from left to right, so that a previous stage is shown to the left of a new stage, and the first character of a multi- character candidate is on the left of the successively written characters of the candidate.

Figure 6:
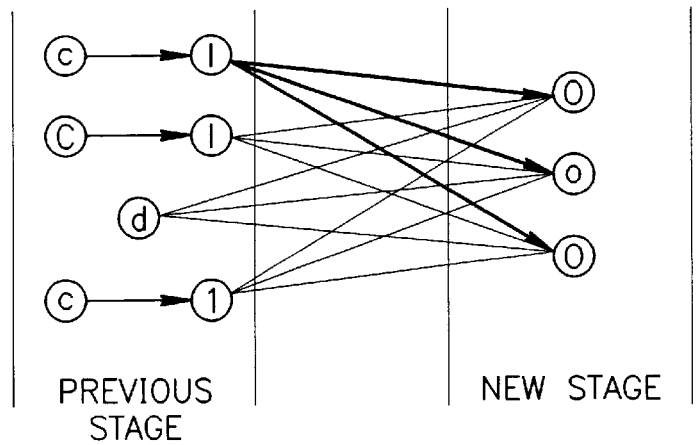
FIG. 6 illustrates connection of a new stage to a previous stage shown in FIG. 3.

When a new vector is presented to the linguistic recognizer, a new stage is formed and placed to the right of the previous stage, as depicted in FIG. 6. After creating the new stage and placing it to the right of the previous stage, the two stages are connected in the following way: The left-most nodes of the new stage are connected to all the right-most nodes of the previous stage. A probability is then assigned to each edge in the graph, to provide means to distinguish among the likelihood of different character sequences in the graph, as shown in FIG. 7. When a new stage of candidates is added to the graph, for example, the stage which contains the one candidate z, the probability of all the edges (one, in the example given in FIG. 7) connecting the two stages is computed and assigned to the respective new edges. The probability P(y-z) of a new edge y-z is defined as follows:

i) Define, $$P(x_i - y - z) = P(x_i - y)^{*^n} \sqrt{P_{TRI}(x_i - y - z) * P_{SRL}(x_i - y - z) * P(z)} \quad (I)$$

wherein:
n is the number of nodes in the candidate that node z belongs to;
$P(x_i\text{-}y)$ is the probability of the edge $x_i\text{-}y$;
$P_{tri}(x_i\text{-}y\text{-}z)$ is the tri-gram probability of the three-character sequence in nodes $x_i\text{-}y\text{-}z$;
$P_{SRL(xi}\text{-}y\text{-}z)$ is the SRL probability of the three-character sequence in nodes $x_i\text{-}y\text{-}z$, and
P(z) is the shape probability of the candidate which node z belongs to.

ii) Calculate $P(x_i\text{-}y\text{-}z)$ for all edges xi entering the node y, and assign $\max[P(x_i\text{-}y\text{-}z)]$ (the maximal probability among all $P(x_i\text{-}y\text{-}z)$ so defined), to P(y-z).

iii) Assign a pointer that points from the y-z edge to the $x_i$-y edge that corresponds to the maximal path value found in (ii). This pointer, called "best path pointer y-z" points at the edge leading to the processed edge that resulted in maximal probability.

The probability of an edge is the highest path probability among all paths ending with the edge. Path probability is the probability that the sequence of characters represented by the path nodes is the correct character sequence. To make this dependency clearer, there may be more than one path leading to the two nodes connected by a given edge. The probability of the most likely path is the probability assigned to the edge.

In order to set the dynamic DAG data structure in motion, the first two stages of the graph are initialized in the following way:

1. Create two stages, each containing one node;
2. Assign the character "space" to the two nodes (the symbol "#" designates the character "space");
3. Connect the two stages with one edge, and
4. Assign the probability 1.0 to the edge connecting the said two nodes.

The two stages, their connecting edge, and probability, are depicted in FIG. 8.

Another, more general, mechanism, which is used to improve the overall probability assigned to complete word paths, becomes active when the unique delimiter character edge is encountered. A "delimiter character," in this context, means a character which is used to mark the end of a word, such as "space", ",", and "?", etc. The general mechanism uses the statistical dictionary, the third component of the language information module.

When a node contains a delimiter character, the probability of its incoming edges is first calculated with the N-gram mechanism. After the local edge probability of the edge y-delimiter is calculated, the linguistic probability mechanism becomes active and determines whether the edge probability should be adjusted. The adjustment of an edge is determined as follows:

i) A set $\Omega$ is defined as the set of all the paths in the graph that correspond to words found in the dictionary. For each word in $\Omega$, the word probability is defined as:

$$P(word) = P_{dic}(word) * \pi P_{z \in word}(z) * \pi P_{SRL_{x-y-z \in word}}(x-y-z) \quad (II)$$

wherein:
$P_{dic}(word)$ is the probability associated with the said word in the dictionary;
P(z) is the probability of the character in the z node to be the correct character, as calculated by the shape recognizer, and
$P_{SRL}$(x-y-z) is the SRL probability of the three-character sequence x-y-z (including the two delimiters).

ii) If $$\max_{word \in \Omega}[P(word)]$$

is greater than the shape recognizer's calculated local edge probability P(y-delimiter), then a P(y-delimiter) is substituted with $$\max_{word \in \Omega}[P(word)]$$

and all its composing edges are marked with a flag, as will be hereinafter described.

At any time the main processor signals the linguistic recognizer (the latter being the last recognition stage) to release results, the character sequence corresponding to the most likely path is passed to the main processor and constitutes the sequence of the recognized characters. To find the most likely path, the linguistic recognizer searches among the last-entered edges for that edge with the highest probability, and thereafter follows the best path pointers leading from each edge to its preceding most likely path edge. The pointer structure developed here ensures that the most likely path is unambiguous and readily available, once the edge with the highest probability among the last-created edges is located.

FIG. 9A presents a graph having its starting and ending nodes each filled with a "space" character, and the connecting edges are assigned with their respective edge probabilities. The probabilities shown are based only on tri-gram and SRL information. Each pointer points at the preceding edge that contributed to the maximal path probability.

As can be seen in FIG. 9A, the pointer of the last edge points at the "e-t" edge. Since the ending character in the graph is a terminating character ("space"), the statistical dictionary can be applied to all the paths that span from the graph. In the example given, there are two paths corresponding to the words "that" and "thet." Only the word "that" is found in the dictionary, and the associated path probability according to equation I is 0.2. Since the resulting dictionary probability is higher than the previous edge probability, 0.07, as calculated with the tri-gram and SRL probabilities, the "t#" edge probability changes to that obtained by the statistical dictionary (FIG. 9B). As can be seen in the figure, the pointer of the "t-#" edge changes its direction to point at the preceding edge that belongs to the new most likely path—the path that corresponds to the path having a dictionary probability higher than the previous edge probability. Consequently, all edge best path pointers should be reassigned to reflect the sequence of preceding best path edges that belong to the path word that corresponds to the higher overridging edge probability (linguistic override).

The motivation to consider contextual or linguistic rules as a recognition stage, is based on the assumption that the text being written is lingual; thus, the writer is a priori conditioned to write certain character sequences. Clearly, such an assumption cannot be substantiated in cases where the written text incorporates little syntax, such as names and professional terms, and may also counter—productively interfere with the recognition ability of the shape recognizer.

Therefore, it is important to provide a linguistic recognition mechanism with the ability to detect when non-lingual texts are being written and, upon such detection, to weigh the importance of the linguistic recognizer relative to that produced by the shape recognizer while making the final recognition decision.

There are many linguistic indicators that can be used to detect the departure of a written text from lingual writing rules. For example, in the English language, an increased use of non-alphabetic characters, such as numbers and other symbols relative to alphabetic ones, is a good indicator of non-linguistic texts.

Another, more universal, non-lingual text detector can be applied. The advantage of such a detector is that it is language-independent, and its application is simple. Considering the paths $x_i$-y-z of FIG. 7, if:

i) the difference between the highest and the lowest probability $P(x_i$-y-z) of all $x_i$ entering the node y is below a first predetermined value, and/or ii) the highest probability $P(x_i$-y-z) is below a second predefined value, the SRL and tri-gram information is ignored and only the shape probability is used to calculate the edge probability P(y-z).

Turning to FIG. 10, there is illustrated the input pattern of FIG. 2 in conjunction with the actual processing thereof, showing the candidate vectors together with their respective shape probabilities entered into the linguistic recognizer B.

The first vector presented to the linguistic recognizer is, as shown, $$\begin{bmatrix} d, 0.6 \\ cl, 0.4 \end{bmatrix}$$

Figure 11:
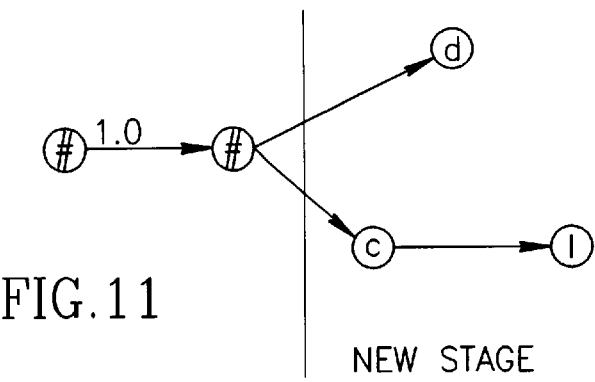
FIG. 11 shows the graph after incorporating the two candidates of the first vector and constructing the appropriate edges.

The resulting DAG graph, after initialization and incorporating the first vector, is depicted in FIG. 11 with the a priori conditioned tri-gram probabilities:

$P_{tri}(\#-\#-d)=0.016$
$P_{tri}(\#-\#-c)=0.033$
$P_{tri}(\#-c-l)=0.033$
SRL probabilities:
$P_{SRL}(\#-\#-a)=0.44$
$P_{SRL}(\#-a-a)=0.96$ Using the equation and the candidate probabilities given in the first vector, the following edge probabilities are obtained:

$$P(\# - d) = 1.0^{*1} \sqrt{0.016*0.44*0.6} = 0.004224$$

$$P(\# - c) = 1.0^{*2} \sqrt{0.033*0.44*0.4} = 0.076210$$

$$P(c - l) = 0.07620^{*2} \sqrt{0.033*0.96*0.4} = 0.008579$$

Figure 12:
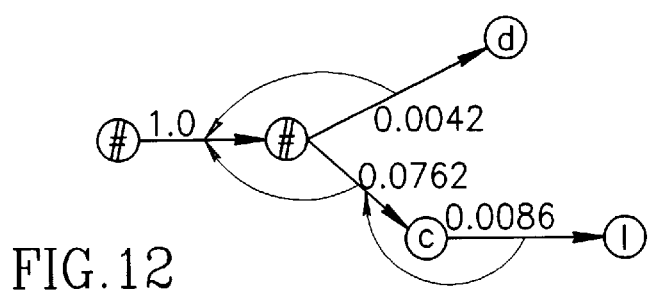
FIG. 12 depicts the graph corresponding to the first vector of candidates presented to the linguistic recognition stage, the edge probabilities of the first stage, and the most likely path pointers.

Adding these edge probabilities to the first stage enables marking of the most likely path pointers for each new node in the graph, as seen in FIG. 12.

If the main process requires the release of recognition results at this stage, the recognizer's output would be the string "cl" since the linguistic recognizer has overridden the shape results "d".

Figure 13:
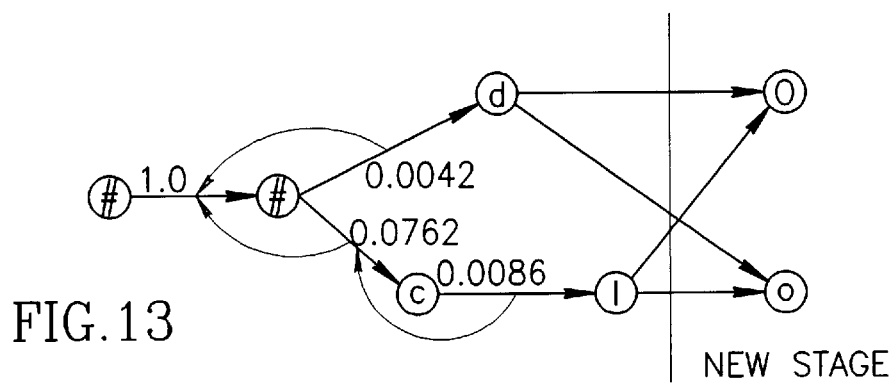
FIG. 13 illustrates the graph after the second vector was obtained from the shape recognizer stage and the new stage has been connected to the ending nodes of the previous stage.

The second vector of FIG. 10, $$\begin{bmatrix} o, 0.7 \\ O, 0.3 \end{bmatrix}$$

is now presented to the linguistic recognizer. The resulting DAG graph with the second vector is shown in FIG. 13.

The relevant tri-gram probabilities are:

$P_{tri}(\#-d-O)=0.09$
$P_{tri}(c-l-O)=0.1$
$P_{tri}(\#-d-o)=0.09$
$P_{tri}(c-l-o)=0.1$
The SRL probabilities are:
$P_{SRL}(\#aA)=0.001$
$P_{SRL}(aaA)=0.001$
$P_{SRL}(\#aa)=0.96$
$P_{SRL}(aaa)=0.74$ Using the equation and candidate probabilities given in the first vector, one obtains the following edge probabilities for the second stage:

$$P(d - O) = 0.0042*^1 \sqrt{0.09*0.001*0.7} = 0.00000026 = 2.6E - 7$$

$$P(d - o) = 0.0042*^1 \sqrt{0.09*0.96*0.3} = 0.00011 = 1.1E - 4$$

$$P(l - O) = 0.0086*^1 \sqrt{0.1*0.001*0.7} = 0.0000006 = 6.0E - 7$$

$$P(l - o) = 0.0086*^1 \sqrt{0.1*0.74*0.3} = 0.00019 = 1.9E - 4$$

Figure 14:
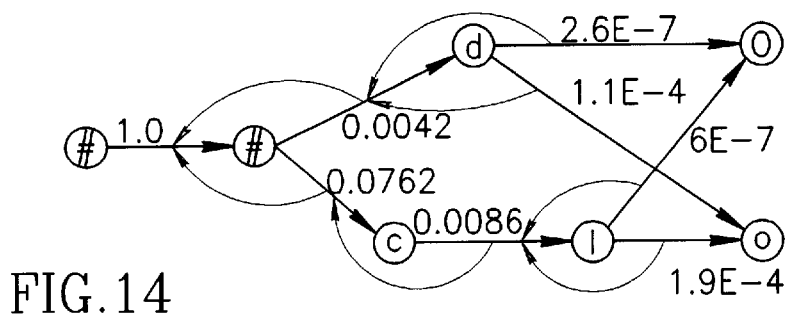
FIG. 14 shows edge probability assigned to the edges connecting the second stage with the first stage, and the resulting most likely path pointers.

The resulting graph with the respective edge probabilities and most likely path pointers is illustrated in FIG. 14.

If the main process requires the release of recognition results at this stage, the recognizer's output would be the string "clo" since the linguistic recognizer has overridden the shape results "dO".

Figure 15:
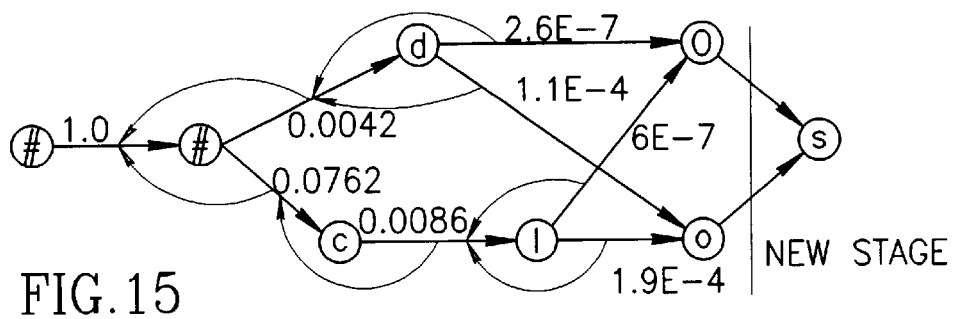
FIG. 15 is the graph after the third vector was obtained from the shape recognizer stage and the new stage has been connected to the ending nodes of the previous stage.

The third vector of FIG. 10,

[s, 1.0]

is, in turn, presented to the linguistic recognizer B. The resulting DAG graph with the third vector is shown in FIG. 15.

The tri-gram probabilities are:

$P_{tri}(d-O-s)=0.001$
$P_{tri}(l-O-s)=0.05$
$P_{tri}(d-o-s)=0.001$
$P_{tri}(l-o-s)=0.05$
The SRL probabilities are:
$P_{SRL}(aAa)=0.001$
$P_{SRL}(aaa)=0.74$
Thus, the following edge probabilities:

$$P(O - s) = \max[P(d - O - s), P(l - O - s)] =$$
$$\max[(2.6E - 7 *^1 \sqrt{0.0001*0.001*1.0}),$$
$$(6E - 7 *^1 \sqrt{0.05*0.001*1.0})] = 3.0E - 11$$

$$P(o - S) = \max[P(d - o - s), P(l - o - s)] =$$
$$\max[(1.1E - 4 *^1 \sqrt{0.001*0.74*1.0}),$$
$$(1.9E - 4 *^1 \sqrt{0.05*0.74*1.0})] = 7.0E - 6$$

Figure 16:
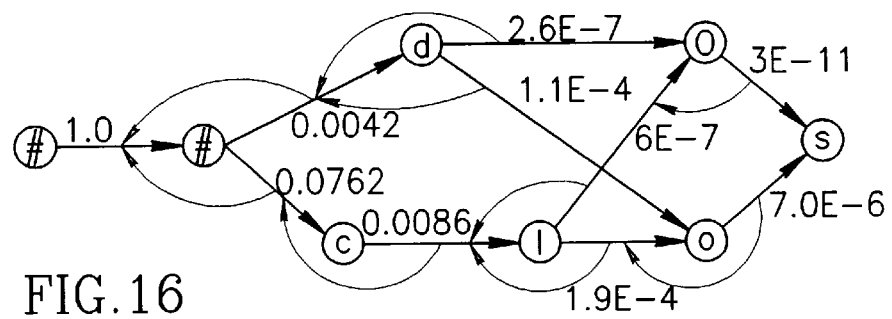
FIG. 16 illustrates edge probability assigned to the edges connecting the third stage with the second stage, and the resulting most likely path pointers.

The resulting graph with the respective edge probabilities and most likely path pointers is illustrated in FIG. 16.

If the main process requires the release of recognition results at this stage, the recognizer's output would be the string "clos" since the linguistic recognizer has overridden the shape results "dOs".

Figure 17:
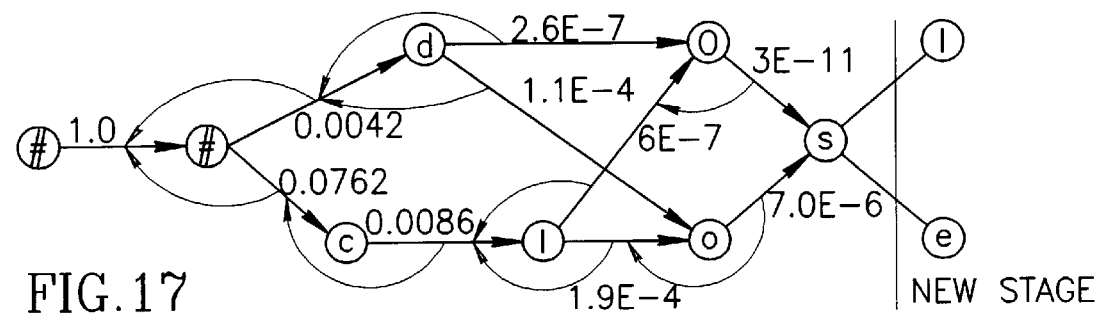
FIG. 17 depicts the graph after the fourth vector was obtained from the shape recognizer stage, and the new stage has been connected to the ending nodes of the previous stage.

The fourth vector of FIG. 10, $$\begin{bmatrix} 1, 0.53 \\ e, 0.47 \end{bmatrix}$$

can now be presented to the linguistic recognizer. The resulting DAG graph with the fourth vector is shown in FIG. 17.

Figure 18:
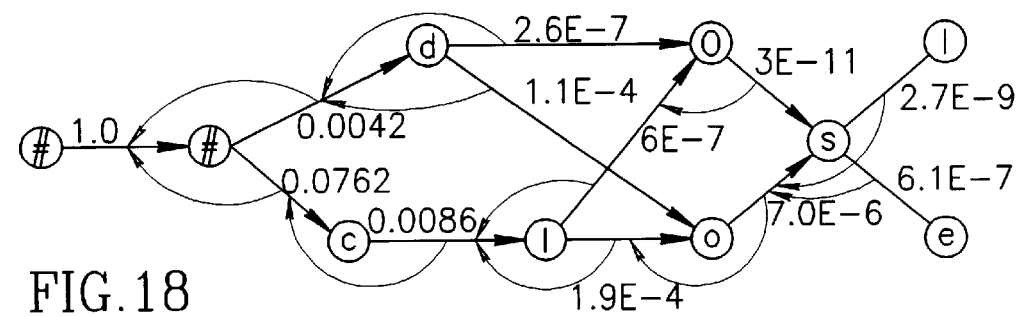
FIG. 18 shows edge probabilities assigned to the edges connecting the fourth stage with the third stage, and the resulting most likely path pointers.

The relevant tri-gram probabilities are:

$P_{tri}(o-s-l)=0.001$
$P_{tri}(o-s-e)=0.25$
The SRL probabilities are:
$P_{SRL}(Aaa)=0.85$
$P_{SRL}(aaa)=0.74$ Thus, the respective edge probabilities are:

$P(s-1) =$
$\max[P(O-s-l), P(o-s-e)] = \max[(3E-11*^1\sqrt{0.001*0.85*0.53}),$
$(7E-6*^1\sqrt{0.001*0.74*0.53})] = 2.7E-9$ $P(s-e) = \max[P(O-s-e), P(o-s-e)] =$
$\max[(3E-11*^1\sqrt{0.25*0.85*0.47}),$
$(7E-6*^1\sqrt{0.25*0.74*0.47})] = 6.1E-7$ The resulting graph with the respective edge probabilities and most likely path pointers is illustrated in FIG. 18.

If the main process requires the release of recognition results at this stage, the recognizer's output would be the string "close" since the linguistic recognizer has overridden the shape results "dOsl".

The fifth vector of FIG. 10, $$\begin{bmatrix} \text{space,} & 0.7 \\ \text{no space,} & 0.3 \end{bmatrix}$$

is subsequently presented to the linguistic recognizer. Therefore, in the resulting DAG graph for the fifth vector, seen in FIG. 19:
the relevant tri-gram probabilities are:
$P_{tri}(s\text{-}l\text{-}\#)=0.001$
$P_{tri}(s\text{-}e\text{-}\#)=0.26$
and the SRL probability is:
$P_{SRL}(aa\#)=0.44$
One obtains the following edge probabilities:

$P(1-\#) = 2.7E-9*^1\sqrt{0.001*0.44*0.7} = 8.3E-13$
$P(1-\approx) = P(s-1)*P(\approx) = 2.7E-9*^1\sqrt{0.3} = 9.0E-10$ It should be noted that an edge ending with a "no space" character receives a positive bias as a result of not being multiplied by a tri-gram and SRL probabilities.

Figure 20:
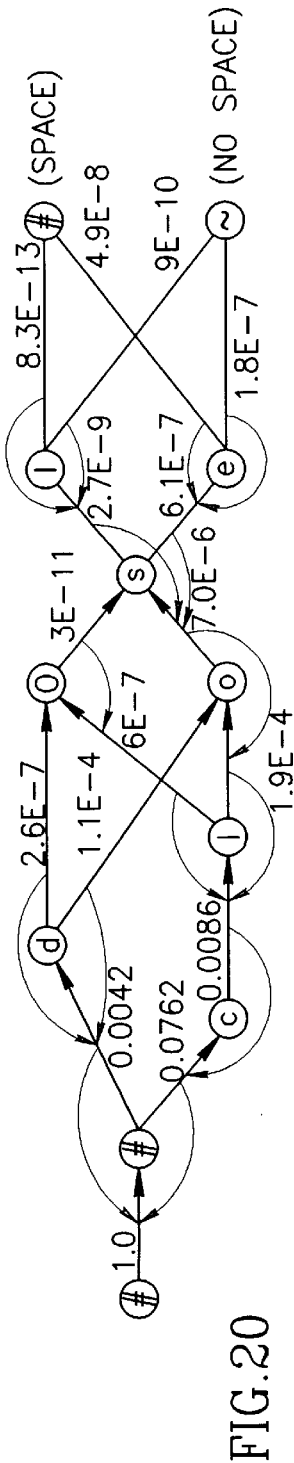
FIG. 20 shows a five-stage graph with edge probabilities assigned and the most likely path pointers marked.

$P(e-\#) = 6.1E-7*^1\sqrt{0.26*0.44*0.7} = 4.9E-8$
$P(e-\approx) = P(s-e)*P(\approx) = 6.1E-7*0.3 = 1.8E-7$ The resulting graph with the respective edge probabilities and most likely path pointers is illustrated in FIG. 20.

Figure 19:
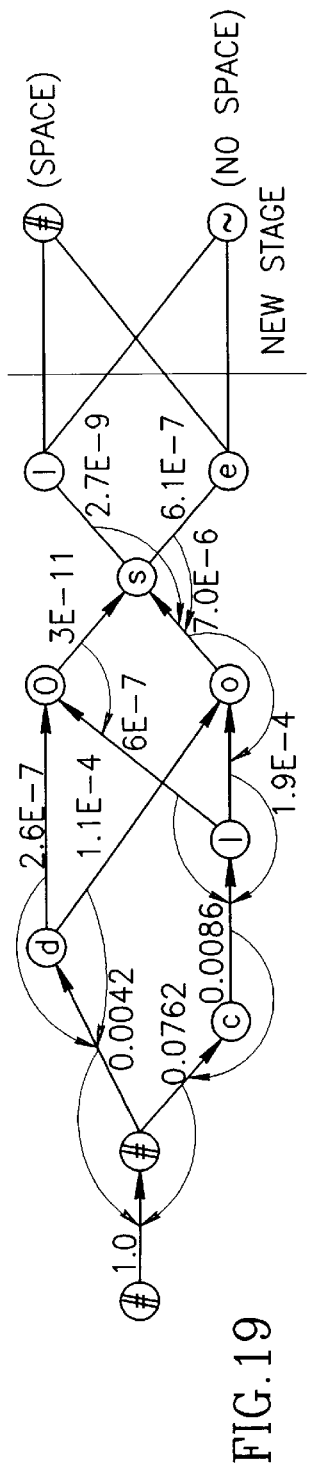
FIG. 19 shows the graph after the fifth vector was obtained from the shape recognizer and the new stage has been connected to the ending nodes of the fourth stage.

As was shown in FIG. 19, edges ending with a "no space" character receive a positive bias, due to the fact that in their calculation the SRL and tri-gram probabilities are not included. There are ways to balance this bias, but, in general, one would want to maintain some positive bias to counterbalance the advantage short character sequences have, relative to longer ones.

If the main process requires the release of recognition results at this stage, the recognizer's output would be the string "close≈" since the linguistic recognizer has overridden the shape results "dOsl#".

The fifth, and last, candidate vector included a space character, and therefore the statistical dictionary mechanism is activated to check whether a word exists in the graph which receives a probability greater than the most likely path probability.

Figure 21:
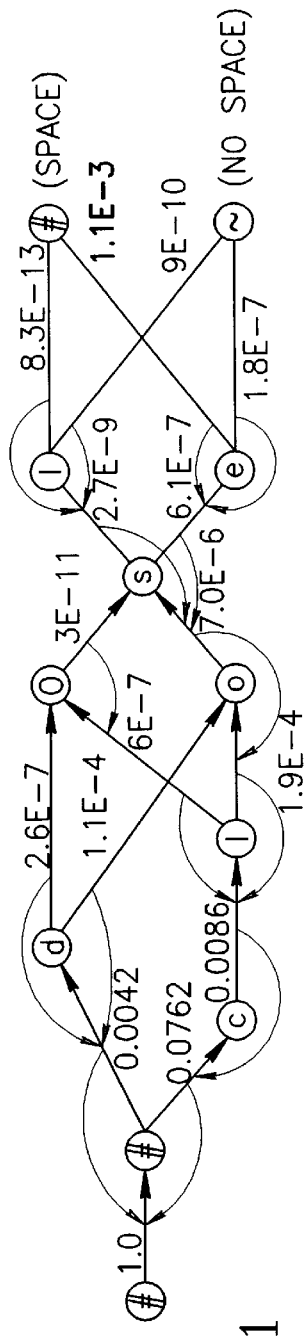
FIG. 21 shows the graph, edge probabilities, and most likely path pointers after a word in the graph was found in the dictionary and overrides the previous most likely path; consequently, both last stages (most likely path pointers and edge probability) change accordingly.
Figure 22:
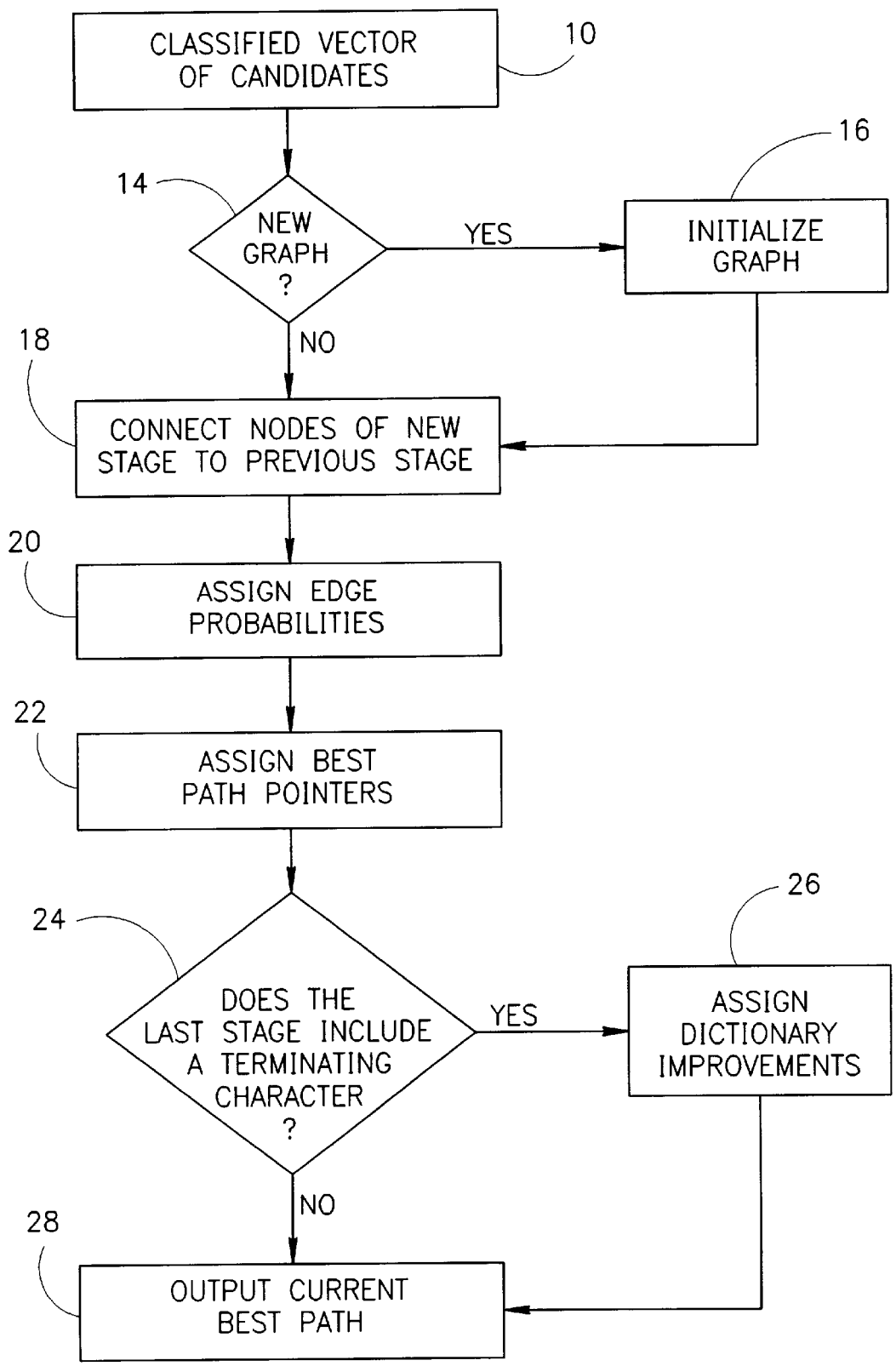
FIG. 22 is a block diagram of a linguistic recognizer system according to the present invention.

If the following probabilities appear for the two words that are found in the dictionary:

$P_{dic}(\text{close})=0.25$
$P_{dic}(\text{dose})=0.1$
then, according to the equation, $P(\text{close})=0.25*(0.4*0.3*1.0*0.47)$
$*(0.44*0.96*0.74*0.74*0.74*44)=1.1E\text{-}3$ $P(\text{dose})=0.1*(0.6*0.3*1.0*0.47)*(0.44*0.96*0.74*0.74*0.44)=$
$8.6E\text{-}4$ The resulting graph, with the respective edge probabilities and most likely path pointers, is shown in FIG. 21.

If the main process requires the release of recognition results at this stage, the recognizer's output would be the word "close#" since the dictionary probability for this word was higher than the previous probability of the sequence "close≈".

The operation of the pattern recognition system according to the present invention will now be described with reference to FIGS. 1 and 22–26.

As described hereinbefore with reference to FIG. 1, the stream of classified vectors of candidates at the output of the shape recognizer A, is applied to the linguistic recognizer B having an output unit 12. Unit 14 of the linguistic recognizer B, shown in FIG. 22, obtains classified vectors of candidate characters from unit 10, and checks whether a new graph of character combination should be issued. If yes, unit 16 initializes the graph. Unit 18 builds the graph edges by connecting nodes of each new stage of candidate characters to the nodes of the previous stage. Unit 20 assigns edge probabilities to the newly-formed edges. Unit 22 assigns the best pass pointers which point from each node to the node in a previous graph stage, indicating which of the nodes connected thereto has the highest edge probability. If the last stage in the graph contains a terminating character, a condition checked in unit 24, then unit 26 blends linguistic or dictionary probabilities into the already-existing edge probabilities; otherwise, unit 28 returns the current best path in the graph to the main process.

Figure 23:
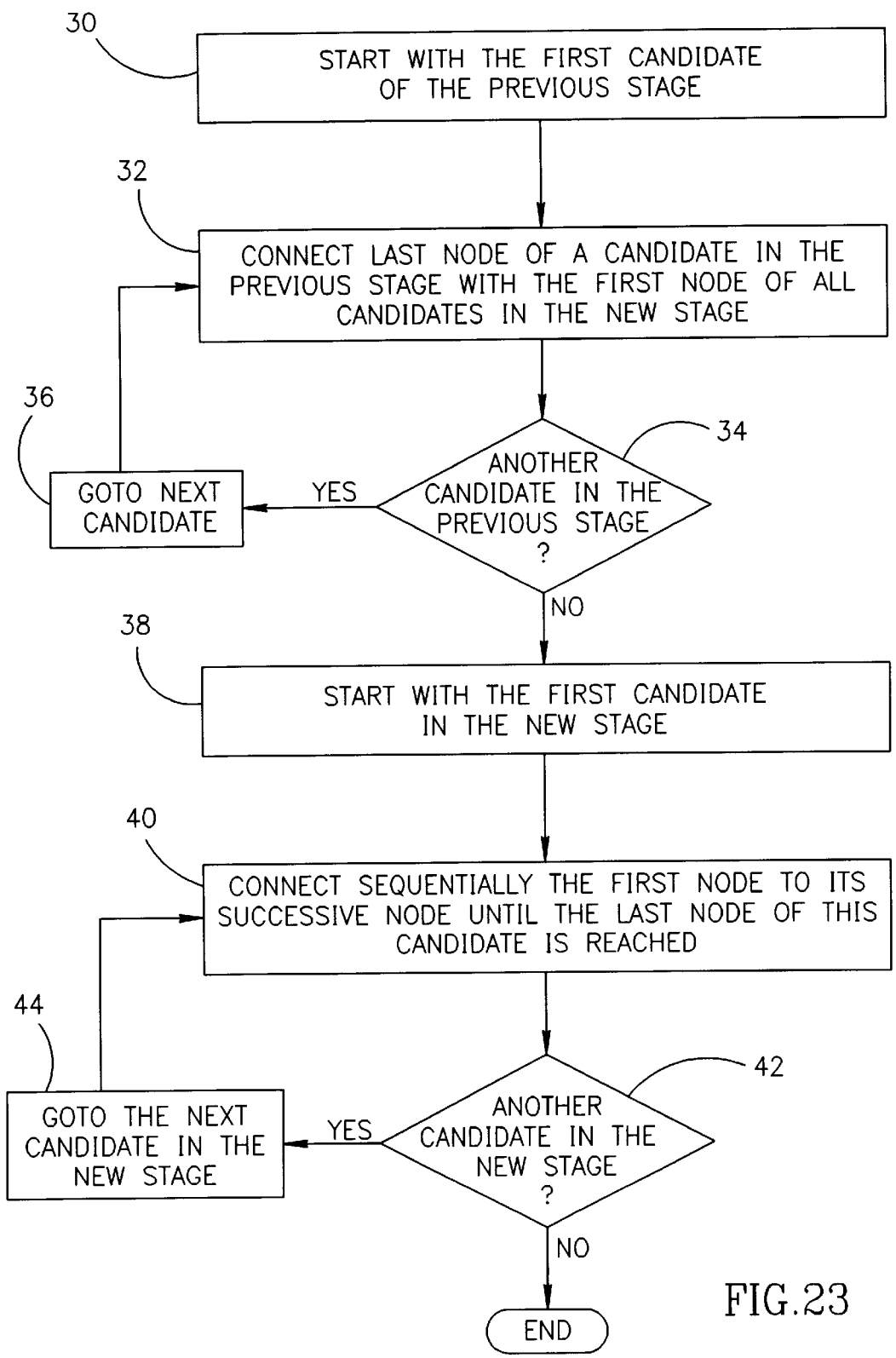
FIG. 23 is a block diagram showing the operation of the connection of nodes between stages.

FIG. 23 provides further elaboration on the details of unit 18, which connects successive candidate vectors to the existing graph. Units 30 through 36 connect an ending node of each candidate vector to all the first nodes of the new candidate vector. Units 38 through 44 connect each node of a candidate in the new candidate vector, sequentially from first to last, to its successive nodes.

Figure 24:
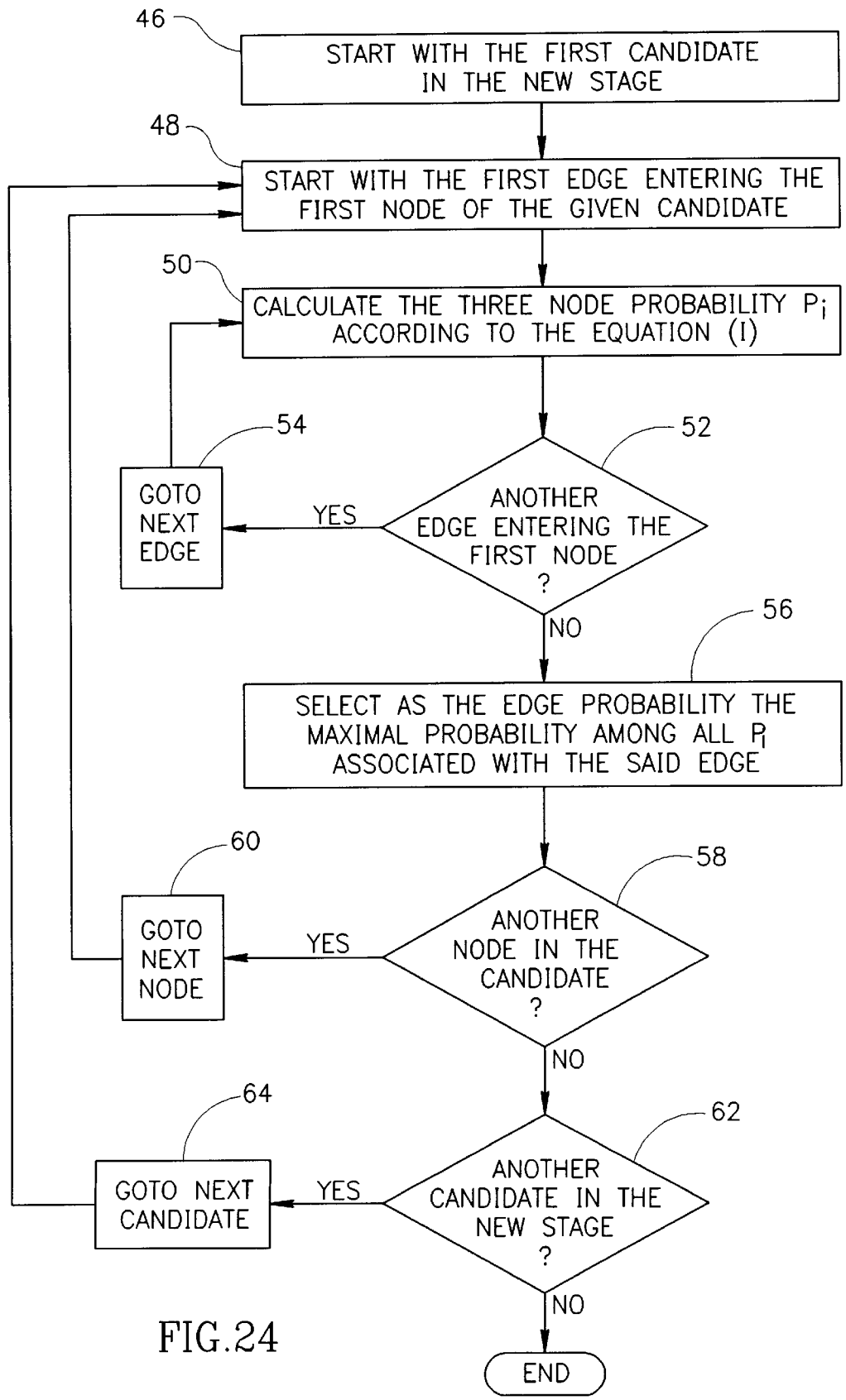
FIG. 24 is a block diagram showing the operation of assigning edge probabilities.

FIG. 24 further elaborates on the details of unit 20, which assigns edge probabilities to new edges in the graph. Unit 46 sets the processor at the first candidate. Unit 48 sets the processor at the first node of the processed candidate. Units 50 through 54 calculate the probabilities $P_i$ resulting from all the three-node paths that end at the first node of each new candidate. In unit 56, the highest probability $P_i$ among the respective probabilities so calculated for a given first node, is chosen as the edge probability of the entering edge to the node. Units 58 and 60 cover the calculations performed in 50 through 54 for all the nodes of the processed candidate, while 62 and 64 cover all candidates.

FIG. 25 depicts details of unit 22, which assigns the best path pointers from each node to a preceding node. Unit 66 sets the processor at the first node of the new candidate vector. Unit 68 directs the best path pointer from the processed node to that node among all nodes leading thereto, which has the highest edge probability. Units 70 and 72 cover all nodes in the new candidate vector.

FIG. 26 illustrates the details of unit 26, which blends dictionary information into the edge probabilities of the last candidate vector. Unit 74 sets the processor at the first node containing a terminating character. Unit 76 sets the processor at the first edge of the current selected node. Unit 78 sets the processor at the first path that ends with the selected edge. In unit 80, the word defined by the selected path is checked for existence in the dictionary. If it is not found in the dictionary, unit 88 checks whether there is another path. If the word is found in the dictionary, the probability of the selected word is calculated in unit 82. If unit 84 finds the so-calculated path probability to be greater than the existing incoming edge probability, then unit 86 replaces the respective incoming edge probability with that of the path so calculated. If, in unit 88, another path is found, unit 90 advances the process to the next path. Unit 92 then checks for the existence of another incoming edge, while unit 94 advances the process to the next incoming edge, if such edge is found. Unit 96 checks for the existence of another terminating node, while unit 98 advances the processor to the next terminating node if such edge is found. If no additional terminating nodes are found, the processor returns to start.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method for pattern recognition of shapes representative of characters defining alphabetic characters, numbers and other symbols, the method comprising the steps of:

identifying, for each of the shapes, at least one candidate character that may be represented by the shape;

forming paths by connecting each candidate character to a previous candidate character or previous candidate characters appearing in a sequence of candidate characters immediately preceding the candidate character;

calculating, for each of the candidate characters, a character probability value representative of a relative confidence in the recognition of an associated shape as that candidate character;

forming said character probability values for each candidate character by blending the character probability values associated with the candidate character and the probability values of language structure associated with the candidate character;

determining best path pointers for identifying a path from each candidate character to a candidate character of an immediate previous stage having a highest character probability value;

selecting, based on analysis of at least one candidate character, which type of probability values of language structure to apply to the candidate characters;

applying, in response to the determining step, the candidate characters to a linguistic recognizer to assign probability values of language structure to the candidate characters; and identifying a path having a highest path probability value wherein a path probability value is based on at least one of the group consisting of character probability values associated with a path and probability values of language structure associated with a path.

2. The method of claim 1 wherein the analysis of at least one candidate character comprises comparing at least one of the character probability values with at least one other probability value.

3. The method of claim 2 wherein the at least one other probability value comprises at least one threshold value that is representative of whether the characters define a lingual character sequence.

4. The method of claim 2 wherein the at least one other probability value comprises a word probability value.

5. The method of claim 1 wherein the analysis of at least one candidate character comprises determining whether the candidate characters represent a lingual character sequence.

6. The method of claim 5 further comprising the step of combining, for each character, the character probability value associated with the character and the probability value of language structure associated with the character.

7. The method of claim 6 further comprising the step of selecting the probability values of language structure from the group of types consisting of language statistical N-grams, where N is a positive integer, and language syntax descriptions.

8. The method of claim 1 wherein the selected type of probability values of language structure comprises statistical dictionary entries.

9. The method of claim 8 further comprising the steps of:

obtaining, for each of the paths, a word probability value from a statistical dictionary component and identifying a path having a highest word probability value; and selecting, from the highest probability path and the highest word probability path, a path with a highest probability.

10. The method of claim 1 further comprising the step of selecting the probability values of language structure from the group of types consisting of statistical dictionary entries, language statistical N-grams, where N is a positive integer, and language syntax descriptions.

11. A pattern recognition system for recognizing shapes representative of characters defining alphabetic characters, numbers and other symbols, the system comprising:

a pattern shape recognizer, including an input device; a digitizer; a segmentation unit; feature extraction unit; and a classification unit for classifying extracted features of the shapes into vectors of candidate characters, each vector constituted by at least one candidate character and at least one path indicator defining possible character sequences between candidate characters corresponding to the shapes, said classification unit assigning to each candidate character a character probability value designating the relative confidence in the recognition of an associated shape as that candidate character;

a linguistic recognizer, adapted to receive the vectors of candidate characters having assigned character probability values, for analyzing at least one candidate character to select which type of probability values of language structure to apply to the candidate characters and for assigning probability values of language structure to the candidate characters to form edge probability values;

a vector selector for identifying a vector having a highest path probability value wherein a path probability value is based on at least one of the group consisting of character probability values associated with a path and probability values of language structure associated with a path;

wherein said linguistic recognizer further comprises:
  means for forming paths by connecting each candidate character to a previous candidate character or previous candidate characters appearing in a sequence of candidate characters immediately preceding the candidate character;
  means for forming character probability values for each candidate character by blending the character probability values associated with the candidate character and the probability values of language structure associated with the candidate character; and
  means for determining best path pointers for identifying a path from each candidate character to a candidate character of an immediate previous stage having a highest character probability value.

12. The system of claim 11 wherein the linguistic recognizer compares at least one of the character probability values with at least one other probability value during the analysis of at least one candidate character.

13. The system of claim 12 wherein the at least one other probability value comprises at least one threshold value that is representative of whether the characters define a lingual character sequence.

14. The system of claim 13 wherein the linguistic recognizer selects the probability values of language structure from the group of types consisting of language statistical N-grams, where N is a positive integer, and language syntax descriptions.

15. The system of claim 12 wherein the at least one other probability value comprises a word probability value.

16. The system of claim 11 wherein the linguistic recognizer determines whether the candidate characters represent a lingual character sequence during the analysis of at least one candidate character.

17. The system of claim 16 wherein the linguistic recognizer combines, for each character, the character probability value associated with the character and the probability value of language structure associated with the character.

18. The system of claim 17 wherein selected type of probability values of language structure comprises statistical dictionary entries.

19. The system of claim 17 wherein the vector selector further comprises:
  means for obtaining, for each of the vectors, a word probability value from a statistical dictionary component and identifying a vector having a highest word probability value; and
  means for selecting, from the highest probability vector and the highest word probability vector, a vector with a highest probability.

20. The system of claim 17 wherein the linguistic recognizer selects the probability values of language structure from the group types consisting of statistical dictionary entries, language statistical N-grams, where N is a positive integer, and language syntax descriptions.

* * * * *